(12) United States Patent
Schaefer

(10) Patent No.: US 11,150,079 B2
(45) Date of Patent: Oct. 19, 2021

(54) DISTANCE MEASURING ELEMENT

(71) Applicant: Robert Bosch GmbH, Stuttgart (DE)

(72) Inventor: Frank-Rene Schaefer, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/965,387

(22) PCT Filed: Feb. 11, 2019

(86) PCT No.: PCT/EP2019/053247
§ 371 (c)(1),
(2) Date: Jul. 28, 2020

(87) PCT Pub. No.: WO2019/170367
PCT Pub. Date: Sep. 12, 2019

(65) Prior Publication Data
US 2021/0148692 A1    May 20, 2021

(30) Foreign Application Priority Data
Mar. 9, 2018 (DE) .......................... 102018203620.9

(51) Int. Cl.
*G01B 11/02* (2006.01)
*H04N 13/239* (2018.01)
*G06K 19/06* (2006.01)

(52) U.S. Cl.
CPC ...... *G01B 11/026* (2013.01); *G06K 19/06056* (2013.01); *H04N 13/239* (2018.05)

(58) Field of Classification Search
CPC ............. G01B 11/026; H04N 13/239; G06K 19/06056; G06K 19/06046; G06K 19/06037
See application file for complete search history.

(56) References Cited

U.S. PATENT DOCUMENTS

| | | | | |
|---|---|---|---|---|
| 2007/0065004 | A1* | 3/2007 | Kochi | G01C 15/02 |
| | | | | 382/162 |
| 2016/0124431 | A1 | 5/2016 | Kelso et al. | |
| 2018/0106606 | A1* | 4/2018 | Fujita | G01B 11/00 |

FOREIGN PATENT DOCUMENTS

| | | |
|---|---|---|
| DE | 112015006609 T5 | 3/2018 |
| EP | 0484132 A2 | 5/1992 |
| EP | 1222604 A1 | 7/2002 |
| WO | 0126032 A1 | 4/2001 |

OTHER PUBLICATIONS

International Search Report for PCT/EP2019/053247, dated May 28, 2019.

* cited by examiner

*Primary Examiner* — Jonathan M Hansen
(74) *Attorney, Agent, or Firm* — Norton Rose Fulbright US LLP; Gerard Messina

(57) ABSTRACT

A distance measuring element including: at least one first subpattern having a nonrepeating structure of values in a defined first value range; and at least one second subpattern, which, in comparison with the first subpattern, has a nonrepeating structure of values in a second value range, the second subpattern having no values in the defined first value range, the at least two subpatterns being superimposed by summing over a defined surface area to form a surface pattern; the minimum distance between the values of the second value range being greater than the maximum value of the first value range.

8 Claims, 8 Drawing Sheets

60

60

DISTANCE MEASURING ELEMENT

FIELD

The present invention relates to a distance measuring element. Moreover, the present invention relates to a method for manufacturing a distance measuring element. The present invention also relates to a device for manufacturing a distance measuring element. In addition, the present invention relates to a computer program product.

BACKGROUND INFORMATION

When distances are measured by stereoscopy, two lenses are used to view two images of a scene captured by spatially offset cameras. Within the images, points are identified which belong to the same object in space. Due to the spatial offset of the cameras, a point in space is projected onto different coordinates uL of a left sensor plane and uR of a right sensor plane. The horizontal offset of coordinates uL and uR of an identified point in both images is referred to as disparity d=uL−uR, the disparity being a measure of the distance of the point from the observer. A basic representation of the principle of stereoscopic recording is shown in FIG. 1.

It is crucial for the functioning of automatic distance measurement by stereoscopy that a point be identifiable in both images. On the one hand, this can be accomplished by using the value itself, but also by using the values of pixels in the immediate vicinity. Such an identification is difficult to impossible in the case of object surfaces having a homogeneous color gradient, in particular.

All points of the homogeneous surface have the same value. For that reason, it is not possible to identify a point by the color value thereof or by that of the neighboring points thereof in such a case.

When working with surfaces that can be shaped or illuminated, a pattern can be applied or illuminated as a distance measuring element. There are a number of conventional approaches for that purpose. In the following, the term "value" can be understood to be both a color value as well as an intensity value (brightness value).

The conventional methods use patterns which each work optimally at only one distance. As the distance increases, however, the area represented by a pixel increases, as shown in principle in FIG. 2.

It is discernible that a nearby surface F1 represented by a pixel P1 requires less averaging than a more distant surface F2 represented by a pixel P2. This is because the two surfaces F1, F2 differ in size, but the two pixels P1, P2 are equal in size, however. The result is that more surface color values are averaged for pixel P2 than for pixel P1.

SUMMARY

It is an object of the present invention to provide an improved distance measuring element.

In accordance with a first aspect, the present invention provides a distance measuring element. In accordance with an example embodiment of the present invention, the distance measuring element includes:
  at least one first subpattern having a non-repeating structure of values in a defined first value range; and
  at least one second subpattern, which, in comparison with the first subpattern, has a non-repeating structure of values in a second value range, the second subpattern having no values in the defined first value range;
  the at least two subpatterns being superimposed by summing over a defined surface area to form a surface pattern; and
  the minimum distance between the values of the second value range being greater than the maximum value of the first value range.

For the distance measuring element, a classification methodology for the surface pattern is thereby devised that renders possible an improved distance measurement from close proximity and from a distance by non-repetitively forming subpatterns on different scales of the surface pattern.

A second aspect of the present invention provides that the object be achieved by a method for manufacturing a distance measuring element. In accordance with an example embodiment of the present invention, the method includes the following steps:
  providing at least a first subpattern having a non-repeating structure of values in a defined first value range; and
  providing at least a second subpattern, which, in comparison with the first subpattern, has a non-repeating structure of values in a second value range, the second subpattern having no values in the defined first value range; and
  the at least two subpatterns being superimposed by summing over a defined surface area, the minimum distance between the values of the second value range being greater than the maximum value of the first value range.

A third aspect of the present invention provides that the object be achieved by a device for manufacturing a distance measuring element. In accordance with an example embodiment of the present invention, the device includes:
  a sequence generator device for generating a base sequence;
  at least two pattern-generating devices to which the base sequence may be fed and which may be used to generate subpatterns; and
  a summing device for superimposing the subpatterns by summing,
  it being possible for at least one first subpattern to be generated that has a non-repeating structure of values in a defined first value range and at least one second subpattern, which, in comparison with the first subpattern, has a non-repeating structure of values in a second value range, the second subpattern having no values in the defined first value range; the at least two subpatterns being superimposed by summing over a defined surface area to form a surface pattern, the minimum distance between the values of the second value range being greater than the maximum value of the first value range.

Preferred specific embodiments of distance measuring element are described herein.

An advantageous further embodiment of the distance measuring element in accordance with the present invention has the feature that a color value or an intensity value may be superimposed by summing. A multiplicity of different embodiments of the surface pattern of the distance measuring element is thereby facilitated.

Another advantageous embodiment of the distance measuring element in accordance with the present invention has the feature that the distance element is at least one of the following: printable, paintable, adhesive, illuminable. A high degree of technological diversification of the distance measuring element is advantageously facilitated in this manner as well.

Another advantageous embodiment of the device in accordance with the present invention provides that the surface pattern be dithered. This advantageously simplifies a manufacturing process for the distance measuring element because a large value range may in a sense be simulated or replicated by a few values.

Another advantageous embodiment of the device in accordance with the present invention has the feature that the value ranges are represented by powers of two. At least two values are needed to be able to distinguish among image elements. Accordingly, the total number of distinguishable values is 2N, N being the number of value ranges (scales). Reducing the values to be distinguished lessens the accuracy requirement related to a color to be applied and the intensity thereof. By specifying powers of two, an optimum use of a value range, respectively of a scale is made possible, whereby a maximum contrast of the pattern of the distance measuring element is attainable. The result is thereby that a stereo camera enhances the ready recognizability of the pattern of the distance measuring element for purposes of distance measurement. Moreover, technical requirements related to a sensor of the stereo camera may thereby be advantageously reduced.

With reference to a plurality of figures, the present invention is described in detail in the following with reference to further features and advantages. Like or functionally equivalent components thereby have the same reference numerals. The primary purpose of the figures is to clarify the main aspects of the present invention and are not necessarily true-to-scale. For the sake of clarity, all of the reference numerals may not be denoted in all of the figures.

Described device features are derived analogously from corresponding described method features and vice versa. In particular, this means that features, technical advantages and embodiments related to the distance measuring element are analogously derived from corresponding embodiments, features and advantages of the method for manufacturing a distance measuring element or of a device for manufacturing a distance measuring element and vice versa.

DETAILED DESCRIPTION OF EXAMPLE EMBODIMENTS

A main feature of the present invention is, in particular, to provide a method and a device which may be used to design surface patterns that are uniquely identifiable from different distances, accordingly on different scales. The surface patterns provided are advantageously not susceptible to camera noise or contrast reduction and may thus be advantageously used for a distance measuring element.

Figure 1:
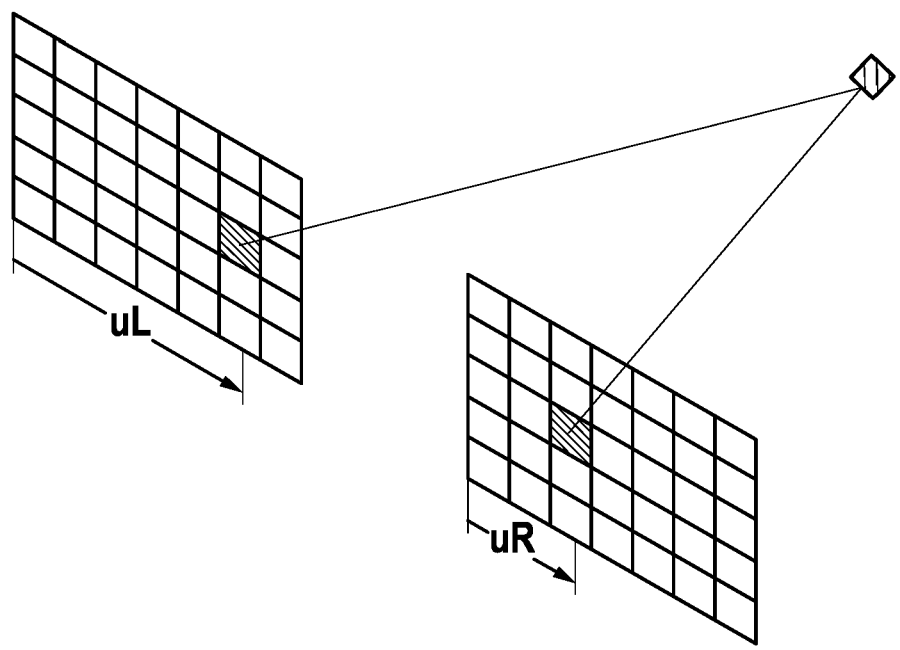
FIG. 1 shows a schematic representation of disparity.
Figure 2:
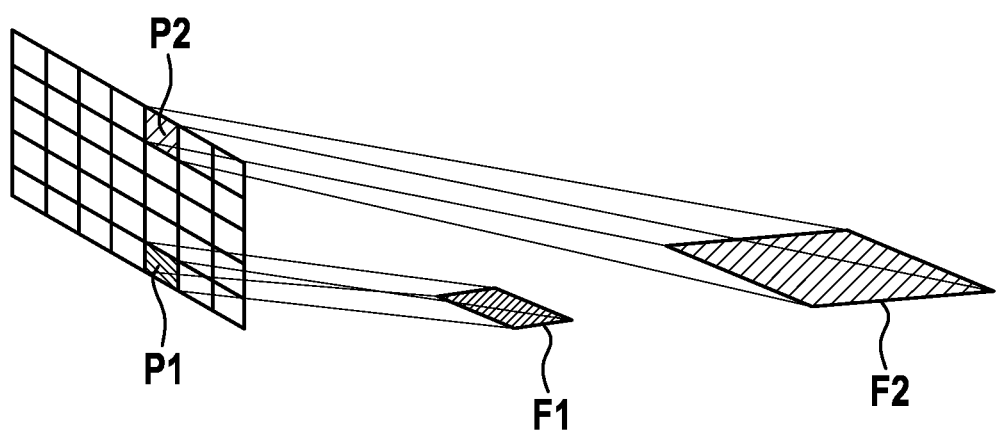
FIG. 2 shows a schematic representation of different averages using pixels in the case of surfaces configured at different distances.

When a surface area is viewed through a camera having discrete image points ("pixels"), the surface area viewed through a pixel increases in size with increasing distance, as basically shown in FIG. 2. A pixel assumes the average color value and intensity value of the surface area that it represents. Superimposing patterns in different orders of magnitude in terms of geometry and values makes possible a recognizability on different scales, as will be explained in greater detail below.

A scale is defined by the size of the geometric surface area that it fills with a value. For example, squares of 4×4 pixels may be filled by the smallest scale; squares of 18×18 pixels may be filled by the next larger scale. The values of a scale are limited. If the values of a scale reside within a range of 0 . . . W1, then it must hold for all values of the higher scales that the minimum distance between the values is greater than W1.

It is, thus, not possible for a value of a small scale to be generated by adding values of a large scale, and vice versa. The value of each scale thereby remains uniquely identifiable. It is thus ensured that the values of the higher scale assume a multiple of upper value W1, whereby a non-repeatability of the subpatterns is provided. This is made possible, in particular because values of the smaller scale may not be confused with values of the larger scale since they do not fall into the value range of the higher scale. The individuality of the non-repeatable sequences is thereby retained. For example, the value in FIG. 3 reaches 64, the minimum distance between the values of subpattern being 64 in FIG. 4.

Each geometric scale thereby has a discrete value range for values which, in terms of magnitude, do not overlap with the value range of another scale.

For example, surface elements having a size of X>Y may be represented by color values as multiples of 64, while values of surface elements of size Y may be represented as multiples of 8, it being necessary that value 64 not be reached. It is thereby achieved that the representation of patterns on larger scales does not influence the differentiability on smaller scales. The total value of the color values is determined by adding the individual values of the various scales.

Figure 3:
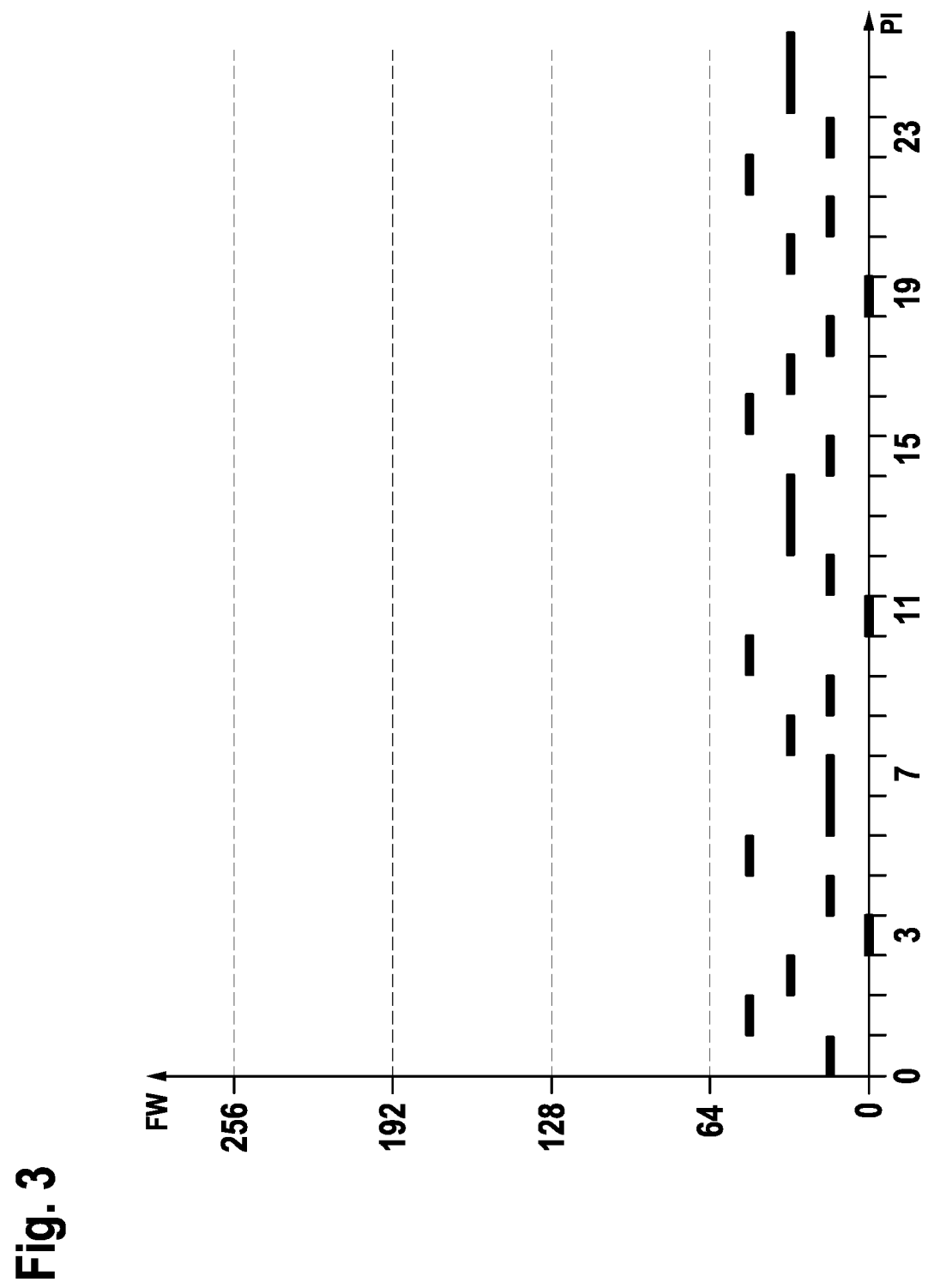
FIG. 3 shows a schematic representation of a first subpattern of a proposed distance measuring element.

This is basically shown in FIG. 3, which illustrates a one-dimensional representation of a first, non-repeating subpattern. Four different, discrete color intensity values FW in a value range from 0 . . . 64 are plotted over a pixel index PI (which represents a line including pixels of an image) in an exemplary range of 0 . . . 24. It is discernible that color intensity value FW assumes four discrete, uniformly spaced, respectively linearly distributed values 0, 16, 32, 48 (step height=16) of value range 0 . . . 64 over entire pixel index PI, color intensity value FW 64 not being reached ("small scale"). Value 0 thereby represents the physical state "black" for the respective pixel; value 48 thereby represents the physical state "bright" for the respective pixel; values 16 and 32 represent color intensity values that lie between the above-mentioned values.

Figure 4:
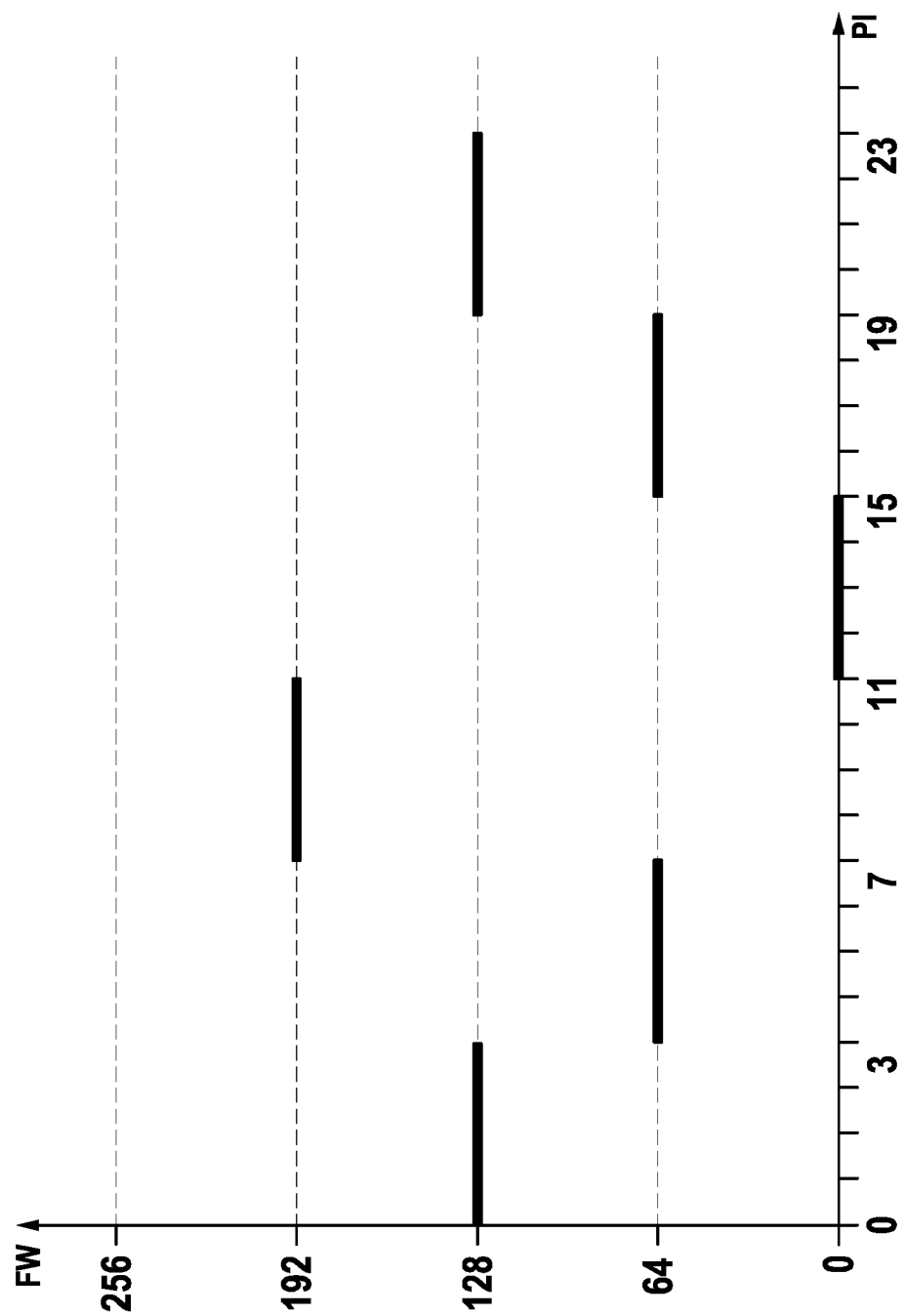
FIG. 4 shows a schematic representation of a second subpattern of a proposed distance measuring element.

On the other hand, FIG. 4 shows a second, one-dimensional non-repeating subpattern on a "large scale," which has four discrete, uniformly spaced, respectively linearly distributed color intensity values FW (step height=64) within a value range of 0 . . . 192 over same pixel index PI of 0 . . . 24. It is discernible here that all color intensity values FW of the second subpattern are greater than 64 and do not have any color intensity values FW in the range of between 0 . . . 63.

Figure 5:
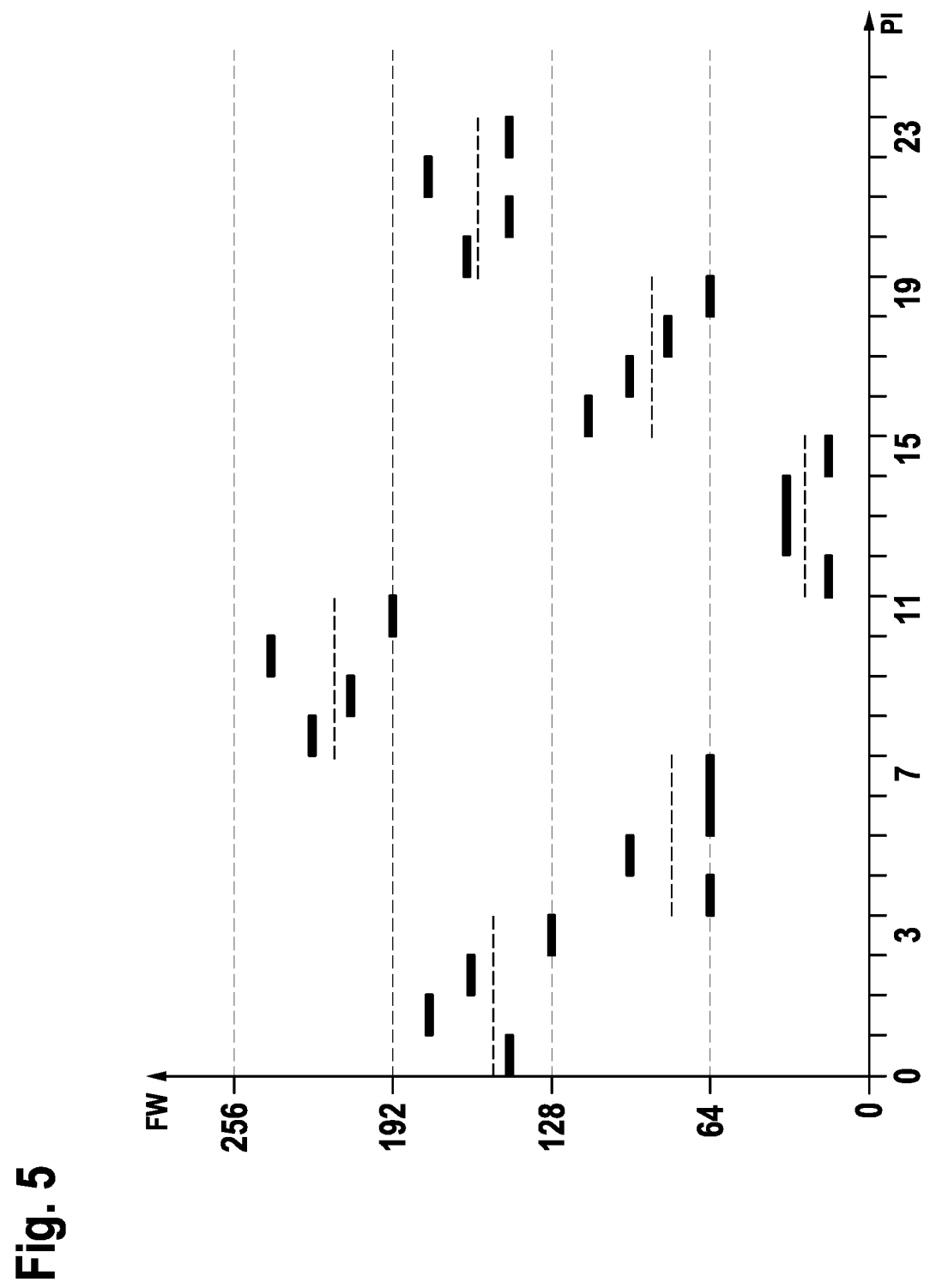
FIG. 5 shows a schematic representation of a surface element including a superposition of the first subpattern with the second subpattern.

FIG. 5 represents superimposing the two non-repeating subpatterns of FIGS. 3 and 4 by summing. It is discernible that a uniqueness or non-repeatability of the overall pattern is achieved over entire pixel index PI 0 . . . 24 because it is possible to differentiate among 4×4 values, i.e., 16 values. Thus, a sensor of a camera that detects the overall pattern must be able to reliably detect sixteen different measured values.

The result in effect is that the surface pattern may be uniquely and unmistakably identified both from a large and small distance. This is achieved in that the non-repeating subpatterns of the surface pattern are formed on different scales or value ranges. In the illustrated example, a number of four discrete values is specified for each of the two scales.

FIG. 5 shows the summation of all values of the subpatterns of the two scales of FIGS. 3 and 4 over the entire range. The short dashed lines, which are each discernible in the range of the four discrete values, each represent the average value of the values of a surface element of the mentioned large scale. As mentioned above, the pixel value of a camera is obtained by averaging the color values and intensity values of a surface area. The further away the object under consideration is, the larger is the surface area over which averaging is performed.

When viewed from close range, the camera is able to discern or differentiate the values of the small scale. Thus, the dashed lines correspond to the pattern on the distance measuring element seen from the camera from a greater distance, altogether, six different average values being recognized in FIG. 5. Because of the large step height of the values of the overall pattern, a pattern corresponding to that of the original large scale of FIG. 4 is imaged on a sensor of the camera. As a result, the camera is able to differentiate the subpatterns of FIGS. 3 and 4 in close and distant observations of the overall pattern of FIG. 5.

An advantageous variant, not shown in the figures, provides that the values of the scales of the two subpatterns be powers of two; the requirements placed on the sensor of the camera being advantageously reduced, making it possible for the sensor to be less sensitive to error influences. The powers of two also advantageously aid in reducing the requirements for a process for printing the distance measuring element because less contrast needs to be produced.

The disjoint structure of the discrete value spaces ensures that the dissimilarity of the values remains. The total values are thereby determined by adding the individual values of the subpatterns on the various scales thereof.

Expressed in mathematical terms, this means that it is assumed that V1(a) and V1(b) are the value at locations a and b, respectively for a pattern of scale 1 (small scale).

For two exemplary patterns V1(a), V1(b), it holds that:
if V1(a) !=V1(b), then V(a) !=V(b).
This follows from:

$$V(a)=V1(a)+\mathrm{sum}(Vi(a), i=2\ldots N)$$

and $$V(b)=V1(b)+\mathrm{sum}(Vi(b), i=2\ldots N)$$

since |V1(a)−V1(b)|<R,
by definition, it holding that: Vi(x)>R, it follows that if V1(a) !=V1(b)<<V(a) !=V(b).

R . . . the smallest distance between values of the next scale, respectively initial values of the next scale.

In the case that a scale has values of 0 . . . 63, for example, then R=64.

Thus, the differentiability of the subpatterns is retained in the overall pattern when the subpatterns are added because the scales cannot cancel each other out. The result is an overall pattern that is shown in FIG. 5 that includes subpatterns that are separable on various value scales and represents an addition of the subpatterns of FIGS. 3 and 4.

Figure 6:
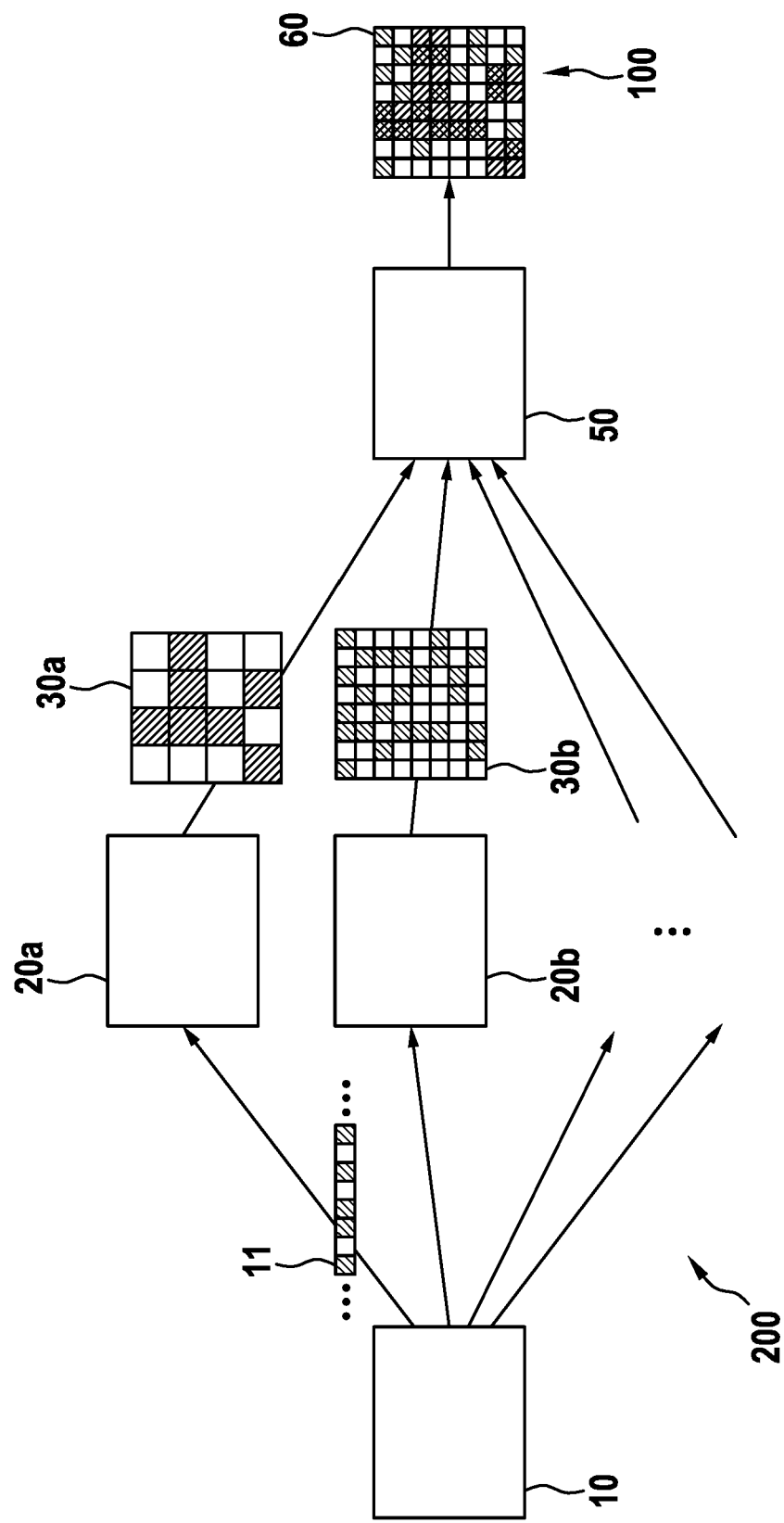
FIG. 6 shows a simplified block diagram of a device for manufacturing a distance measuring element.

FIG. 6 basically illustrates a process, respectively a device 200 for manufacturing an example surface pattern for a distance measuring element 100. Initially, a sequence generator device 10 generates a base sequence 11 of non-repetitive values (color values or intensity values). This means that, for a defined value range W in generated base sequence 11, there is no further position in which there exists a subsequence of length W having the same values. An advantageous variant may determine that one-dimensional base sequence 11 must differ by at least M values. One skilled in the art will recognize that there are numerous options for determining one-dimensional, non-repetitive base sequence 11 that will not be discussed in detail here since they are not essential to the present invention.

This one-dimensional base pattern, respectively one-dimensional base sequence 11 is fed to pattern generator devices 20a . . . 20n for various scales. In the simplest case, a two-dimensional pattern from a randomly shifted base sequence 11 of a column may be copied into the lines of a pattern. Each scale thereby corresponds to a size of a base pattern and an order of magnitude in value range W. An adder 50 adds subpatterns 30a . . . 30n created in such a way by a pattern generator device 20a . . . 20n, respectively.

One possible approach for producing a two-dimensional pattern from one-dimensional base sequence 11 is to plot the distances, in particular for each line, the first line representing this base sequence 11 exactly. Each additional line would offset base sequence 11 by a random value in each case. Another approach (not shown in the figures) would be to provide a two-dimensional pattern directly. This also applies already to subpatterns 30a, 30b, resulting in surface pattern 60 which is provided for a distance measuring element 100, for example, in an adhesive and/or imprintable and/or paint-on and/or illuminable form.

As a useful application, distance measuring element 100 may be used, for example, for measuring distance in automated parking in parking garages. Also possible are microscopic applications, for example, during manufacture of semiconductor circuits, distance measuring element 100 being used to determine distances to semiconductor circuit elements.

Figure 7:
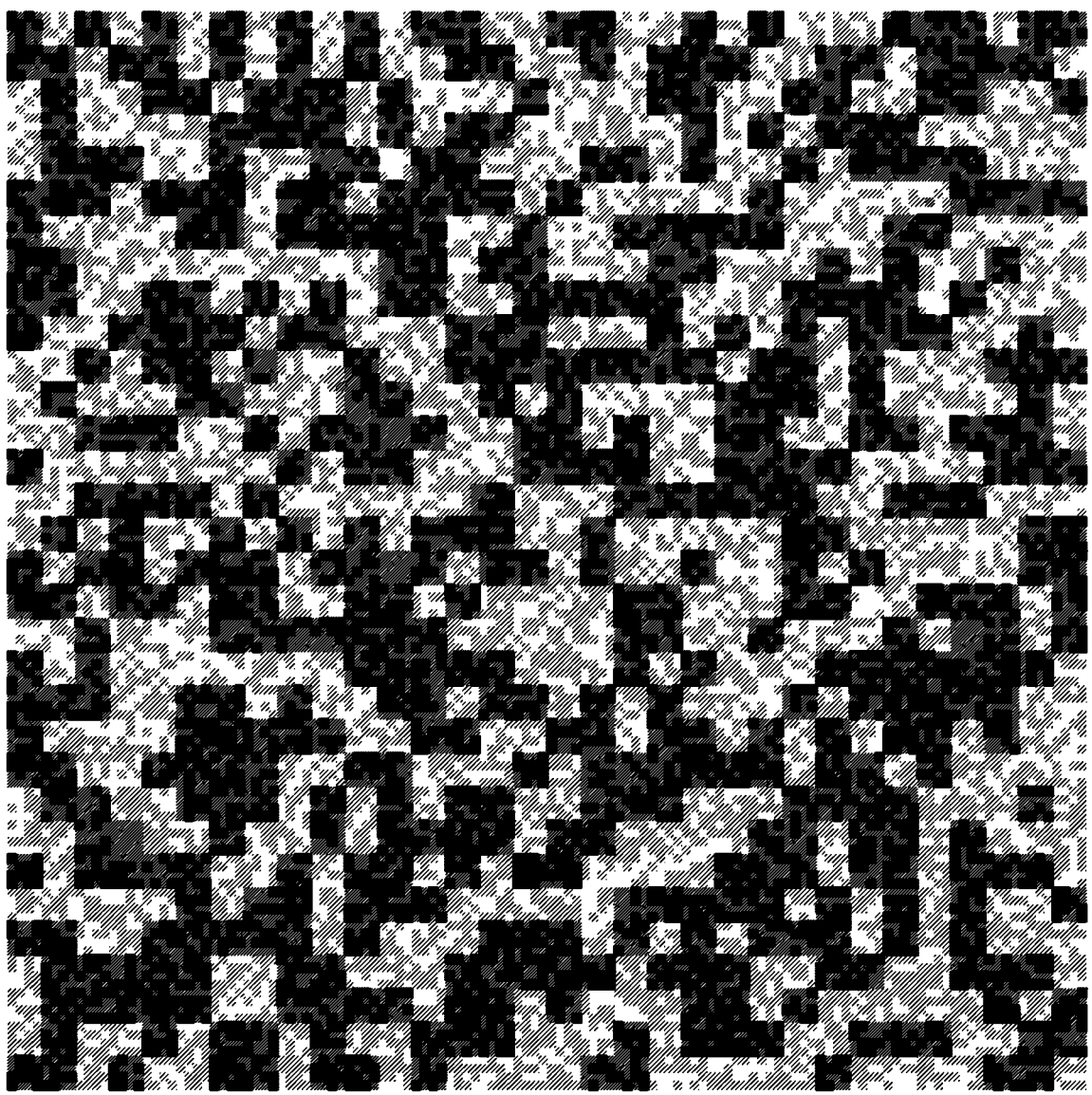
FIG. 7 shows a first specific embodiment of a proposed distance measuring element having a surface pattern.

FIG. 7 shows a specific embodiment of a thus manufactured surface pattern 60 for a distance measuring element 100. Discernible are altogether four intensity values (black—dark grey—light grey—white) of two subpatterns, which feature non-repeatable sequences in different scales.

Figure 8:
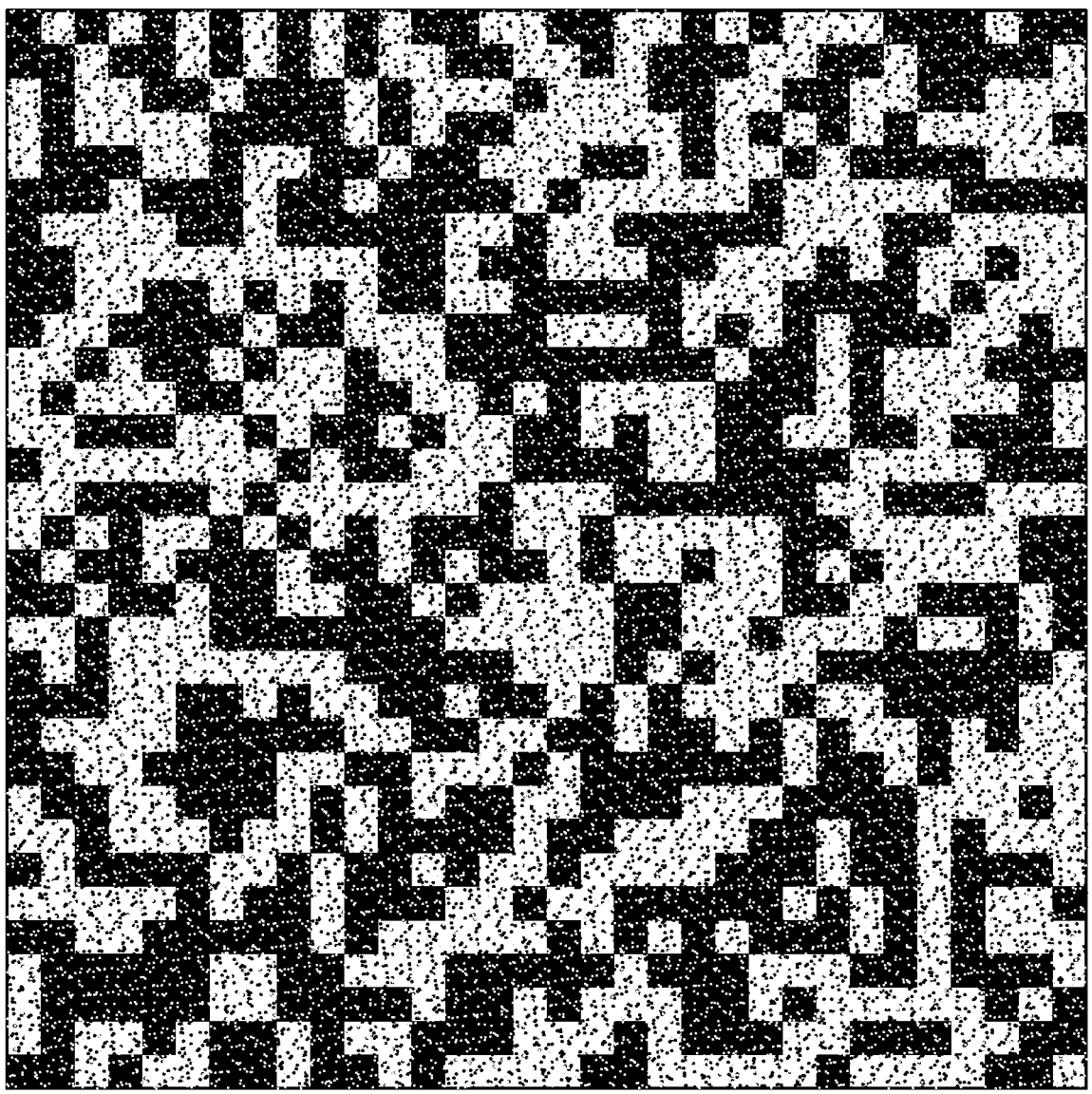
FIG. 8 shows another specific embodiment of a proposed distance measuring element having a surface pattern.

The outlay for producing surface pattern 60 increases with the number of value steps. An improvement is attainable by using "dithering" to present the values, as shown in FIG. 8. FIG. 8 shows surface pattern 60 of FIG. 7 in dithered form. This means that the color values, dark grey and light grey, are simulated at this point by the color values white and black, thereby resulting in a simplified production of surface pattern 60.

As a function of influencing variables such as temperature, light conditions, etc., each camera has a discrepancy in the resolution, whose time characteristic may not be determinable. This, commonly known as "noise" of the camera may be understood to be an additive signal having maximum amplitude 'r,' which is added to pixel value 'p.' Measured value 'g' is expressed as 'r+p.'

It is assumed that '$p_{min}$' and '$p_{max}$' are the values which characterize the limit of the tolerance ranges of the adjacent discrete values of 'p.' Measured value 'g' may be assigned to pixel value 'p' if $g>p_{min}$ and $g<p_{max}$. These values are directly derived from the step heights between the values of the value scales.

If the maximum amplitude of the noise remains below the minimum step height of the respective value scale, then '$r+p>p_{min}$' and '$r+p<p_{max}$,' and the system is insensitive to noise. Therefore, if the noise amplitude of the camera is known, a step height of the value scale should preferably be dimensioned accordingly. This, commonly known as "noise" of the camera may be understood to be an additive signal which is added to the pixel value.

If the maximum amplitude of the noise remains below the minimum step height of the respective value scale of the subpatterns, then the system, i.e., the camera is insensitive to noise. For that reason, step heights of the respective value scales of the pattern of the distance measuring element are preferably specified accordingly. If large steps are thus present in the subpatterns, the camera may advantageously have a substantial noise component (for example, thermal noise) in order to still reliably detect the pattern on the distance measuring element. A reliable detection of the patterns using inexpensive cameras is thereby facilitated.

If the maximum amplitude exceeds the minimum step height between the values of the respective value scale of the particular subpattern, it may be that a pixel value is formed that differs from that intended. Accordingly, pixels may be detected as "identical," which are actually different. At this stage, the likelihood of the amplitude being exceeded may now be considered. In this regard, in determining base sequence 11, it must be established that $$G>R$$

G being the minimum number of different values of each subsequence.

In order for this to function, the disparity analysis must consider at least G pixels in the immediate vicinity. Here as well, the system is insensitive to noise.

If the number of pixels W considered by the disparity analysis is less than G, then a pattern repetition may occur if W−G pixels contain values which repeat in a sequence. If it is assumed that the W−G pixels always do so, a worst-case probability of an error may be defined as the probability that the noise amplitude exceeds the minimum step distance for W−G pixels. Thus, upon recognition of the distance measuring element, errors may occur when the noise of the camera is so intense that the number of different pixels is less than that which may occur randomly due to the noise of the camera. In this context, pixels are understood to be the pattern of the distance measuring element projected onto the sensor of the camera.

This probability may be used to qualitatively assess the overall system and for safety considerations as well.

If none of the above-described methods is practicable for generating a base sequence 11, then a worst-case probability of an error results as the probability that the noise amplitude exceeds the minimum step distance at W−G pixels. In this context, the worst-case probability indicates how likely it is that a pixel does not assume the value of the non-repetitive pattern intended therefore.

Non-repetitive sequences may be made correspondingly robust, so that a number N of errors does not yet lead to a repetitive sequence. For example, if it is ascertained for all pixels of the sequence that a sequence of 11 pixels differs from another sequence by at least two values, then two errors may arise without an error occurring.

A contrast distortion caused by the noise of the camera corresponds to a "compression" or "stretching" of the pixel values. This corresponds to a reduction in minimum value distance R.

The effect of the mentioned contrast distortion is that the numerical pixel values (color or intensity) approach one another more closely. This corresponds to a smaller distance between the step heights of the values of the scales in FIG. 5. If a noise occurs, thus an added signal having a specific amplitude, it becomes more likely that a false step height is assumed.

Figure 9:
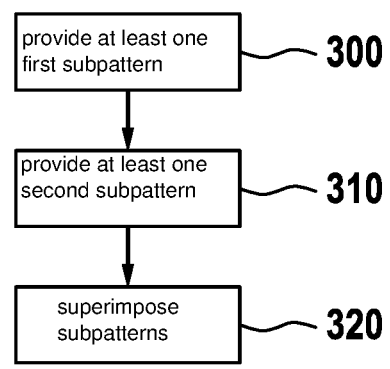
FIG. 9 shows a schematic representation of a method for manufacturing a distance measuring element.

FIG. 9 illustrates a basic sequence of a method for manufacturing a distance measuring element 100.

At least one first subpattern 30a having a non-repeating structure of values in a defined first value range W1 is provided in a step 300.

Step 310 provides at least one second subpattern 30b, which, in comparison with first subpattern 30a, has a non-repeating structure of values in a second value range W2, second subpattern 30b in defined first value range W1 having no values.

The at least two subpatterns 30a, 30b are superimposed by summing over a defined pixel area in a step 320, the minimum distance between the values of second value range W2 being greater than the maximum value of first value range W1.

The above-mentioned method may advantageously be in the form of software that runs on electronic device 200 for manufacturing a distance measuring element 100. This facilitates a ready adaptability of the method and a high degree of automation in the manufacture of distance measuring element 100.

In summary, the present invention provides a multi-scale pattern as a distance measuring element which makes possible the existence of a discrete identifiable pattern on the various scales of the multi-scale pattern, respectively. It may thereby be uniquely identified in a distance measurement from different distances, facilitating an exact distance measurement by stereo cameras.

The surface pattern was described above merely exemplarily with reference to two subpatterns. It is understood, however, that there may also be a greater number of subpatterns of the surface pattern.

One skilled in the art will recognize that numerous modifications of the present invention are possible without departing from the spirit and scope thereof.

What is claimed is:

1. A distance measuring element, comprising:
   at least one first subpattern having a non-repeating structure of values in a defined first value range; and
   at least one second subpattern, which, in comparison with the first subpattern, has a non-repeating structure of values in a second value range, the second subpattern having no values in the defined first value range;
   wherein the first subpattern and the second subpattern are superposed by summing over a defined surface area to form a surface pattern;
   a minimum distance between the values of the second value range is greater than a maximum value of first value range.

2. The distance measuring element as recited in claim 1, wherein the first subpattern and the second subpattern include color values or intensity values.

3. The distance measuring element as recited in claim 2, wherein the distance element is at least one of the following: printable, paintable, adhesive, illuminable.

4. The distance measuring element as recited in claim 1, wherein the surface pattern is dithered.

5. The distance measuring element as recited in claim 1, the values of the first value range and the valves of the second value range are represented by powers of two.

6. A method for manufacturing a distance measuring element, comprising the following steps:
   providing at least a first subpattern having a nonrepeating structure of values in a defined first value range;
   providing at least one second subpattern, which, in comparison with the first subpattern, has a nonrepeating structure of values in a second value range, the second subpattern having no values in the defined first value range and
   superimposing the first subpattern and the second subpattern summing over a defined surface area;
   wherein a minimum distance between the values of the second value range is greater than a maximum value of first value range.

7. A device for generating a distance measuring element, comprising:
   a sequence generator device configured to generate a base sequence;
   at least two pattern-generating devices to which the base sequence can be fed and which can be used to generate subpatterns; and
   an adding device for superimposing the subpatterns by summing;
   wherein the device is configured to generate at least one first subpattern that has a nonrepeating structure of values in a defined first value range, and at least one second subpattern, which, in comparison with the first subpattern, has a non-repeating structure of values in a second value range, the second subpattern having no values in the defined first value range, and the device is further configured to superimpose the first subpattern and the second subpattern by summing over a defined surface area to form a surface pattern;
   wherein a minimum distance between the values of the second value range is greater than a maximum value of first value range.

8. A non-transitory machine-readable storage medium on which is stored a computer program for manufacturing a distance measuring element, the computer program, when executed by a computer, causing the computer to perform the following steps:
   providing at least a first subpattern having a nonrepeating structure of values in a defined first value range;
   providing at least one second subpattern, which, in comparison with the first subpattern, has a nonrepeating structure of values in a second value range, the second subpattern having no values in the defined first value range and
   superimposing the first subpattern and the second subpattern summing over a defined surface area;
   wherein a minimum distance between the values of the second value range is greater than a maximum value of first value range.

* * * * *